United States Patent
Svendsen et al.

(10) Patent No.: US 12,392,861 B2
(45) Date of Patent: Aug. 19, 2025

(54) POSITIONING OF AN APPARATUS USING RADIO SIGNALS

(71) Applicant: NOKIA TECHNOLOGIES OY, Espoo (FI)

(72) Inventors: Simon Svendsen, Aalborg (DK); Johannes Harrebek, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 410 days.

(21) Appl. No.: 17/935,792

(22) Filed: Sep. 27, 2022

(65) Prior Publication Data
US 2023/0095643 A1    Mar. 30, 2023

(30) Foreign Application Priority Data
Sep. 28, 2021    (EP) .................... 21199607

(51) Int. Cl.
G01S 5/06    (2006.01)
G01S 5/02    (2010.01)
H04W 64/00    (2009.01)

(52) U.S. Cl.
CPC ............ *G01S 5/06* (2013.01); *G01S 5/02521* (2020.05); *H04W 64/003* (2013.01)

(58) Field of Classification Search
CPC ....... G01S 5/06; G01S 5/02521; H04W 48/06
See application file for complete search history.

(56) References Cited

U.S. PATENT DOCUMENTS

| | | |
|---|---|---|
| 2008/0129613 A1 | 6/2008 | Ermutlu et al. |
| 2008/0204322 A1 | 8/2008 | Oswald et al. |
| 2010/0123624 A1 | 5/2010 | Minear et al. |
| 2015/0189610 A1 | 7/2015 | Siomina et al. |
| 2019/0037351 A1 | 1/2019 | Prevatt |
| 2019/0335416 A1 | 10/2019 | Kumar et al. |
| 2020/0178028 A1 | 6/2020 | Markhovsky et al. |
| 2020/0229122 A1 | 7/2020 | Kim |

(Continued)

FOREIGN PATENT DOCUMENTS

| | | |
|---|---|---|
| CN | 102323489 A | 1/2012 |
| CN | 102830406 A | 12/2012 |
| CN | 104502926 A | 4/2015 |

(Continued)

OTHER PUBLICATIONS

"3rd Generation Partnership Project; Technical Specification Group Radio Access Network; NR; Physical layer procedures for data (Release 16)", 3GPP TS 38.214 v16.6.0, (Jun. 2021), 172 pages.

(Continued)

*Primary Examiner* — Curtis B Odom
(74) *Attorney, Agent, or Firm* — ALSTON & BIRD LLP

(57) ABSTRACT

An apparatus including multiple antennas and means for converting measurements of time of arrival of a positioning reference signal at the multiple antennas to a compensation value and using the compensation value to produce a compensated time of arrival measurement for the positioning reference signal. The apparatus also includes means for providing compensated time of arrival measurements for a plurality of positioning reference signals from different reference points to enable positioning of the apparatus.

20 Claims, 8 Drawing Sheets

(56) References Cited

U.S. PATENT DOCUMENTS

2021/0058745 A1 2/2021 Markhovsky et al.
2022/0011394 A1* 1/2022 Smith ................ H04L 25/0204

FOREIGN PATENT DOCUMENTS

| CN | 104583803 A | 4/2015 |
|----|----|----|
| EP | 3 254 482 A1 | 12/2017 |
| EP | 3 360 201 A1 | 8/2018 |
| WO | WO 2016/126713 A1 | 8/2016 |
| WO | WO 2017/062902 A1 | 4/2017 |
| WO | WO 2021/032267 A1 | 2/2021 |
| WO | WO 2021/032300 | 2/2021 |
| WO | WO 2022/069184 A1 | 4/2022 |
| WO | WO 2022/069793 A1 | 4/2022 |

OTHER PUBLICATIONS

"3rd Generation Partnership Project; Technical Specification Group Services and System Aspects; Service requirements for the 5G system; Stage 1 (Release 18)", 3GPP TS 22.261 v18.3.0, (Jun. 2021), 85 pages.

"3rd Generation Partnership Project; Technical Specification Group Services and System Aspects; Study on Communication for Automation in Vertical Domains (Release 16)", 3GPP TR 22.804 v16.3.0, (Jul. 2020), 197 pages.

"RAN1#104-e Chairmen's Notes", 3GPP TSG RAN WG1 Meeting #104-e, e-Meeting, (Jan. 25-Feb. 5, 2021), 159 pages.

Akrour et al., "Calibrating Antenna Phase Centers—A Tale of Two Methods", Retrieved via the Internet on Apr. 24, 2023, <URL:https://gge.ext.unb.ca/Resources/gpsworld.february05.pdf>, (Feb. 2005), 5 pages.

Catt et al., "New WID on NR Positioning Enhancements", 3GPP TSG RAN Meeting #90e, RP-202900, (Dec. 7-11, 2020), 5 pages.

Ericsson, "Introduction of NR Positioning Support", 3GPP TSG-RAN WG1 Meeting #99, R1-1913661, (Nov. 18-22, 2019), 11 pages.

Extended European Search Report for European Application No. 21199607.9 dated Mar. 22, 2022, 8 pages.

Intel Corporation et al., "New WID: NR Positioning Support", 3GPP TSG RAN Meeting #83, RP-190752, (Mar. 18-21, 2019), 6 pages.

Kunysz, W., "Antenna Phase Center Effects and Measurements in GNSS Ranging Applications", 2010 14th International Symposium on Antenna Technology and Applied Electromagnetics & the American Electromagnetics Conference, (Jul. 5-8, 2010), 4 pages.

Li et al., "GNSS Antenna Phase Center and Group Delay Evaluating", 2015 IEEE 4th Asia-Pacific Conference on Antennas and Propagation (APCAP), (Jun. 30-Jul. 3, 2015), 2 pages.

Ma et al., "An Indoor Localization Method Based on AOA and PDOA Using Virtual Stations in Multipath and NLOS Environments for Passive UHF RFID", IEEE Access, (May 21, 2018), 11 pages.

Moheb et al., "Phase Centre Analysis of Array Antennas and its Significance for Microwave Landing System", 1991 Seventh International Conference on Antennas and Propagation, ICAP 91 (IEE), (Apr. 15-18, 1991), 4 pages.

Qualcomm Incorporated, "New SID on NR Positioning Enhancements", 3GPP TSG RAN Meeting #86, RP-193237, (Dec. 9-12, 2019), 4 pages.

Wang et al., "Enabling Angle-based Positioning to 3GPP NR Systems", 2019 16th Workshop on Positioning, Navigation and Communications (WPNC), (Oct. 23-24, 2019), 7 pages.

Yashchyshyn et al., "Evaluation of the Impact of the Virtual Phase Centre Effect on the Accuracy of the Positioning System", 2009 3rd European Conference on Antennas and Propagation, (Mar. 23-27, 2009), 4 pages.

Liu et al., "Calibrate GNSS Antenna Phase Center Deviation and Analyze Uncertainty", Journal of Geomatics, vol. 39, No. 3, (Jun. 2014), 10 pages.

Office Action for Chinese Application No. 202211188034.9 dated Apr. 25, 2025, 24 pages.

Yifan, P., "Research on Calibration Method of UWB Indoor Positioning System", Master's Degree Thesis, School of Navigation and Aerospace Engineering, Information Engineering University, (Jun. 2017), 150 pages.

* cited by examiner

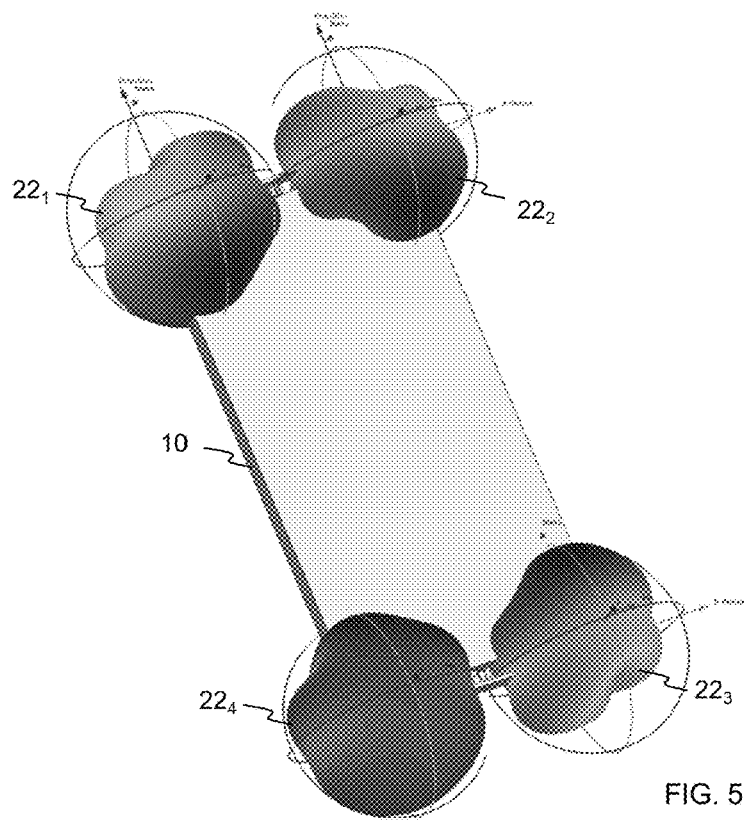
FIG. 5
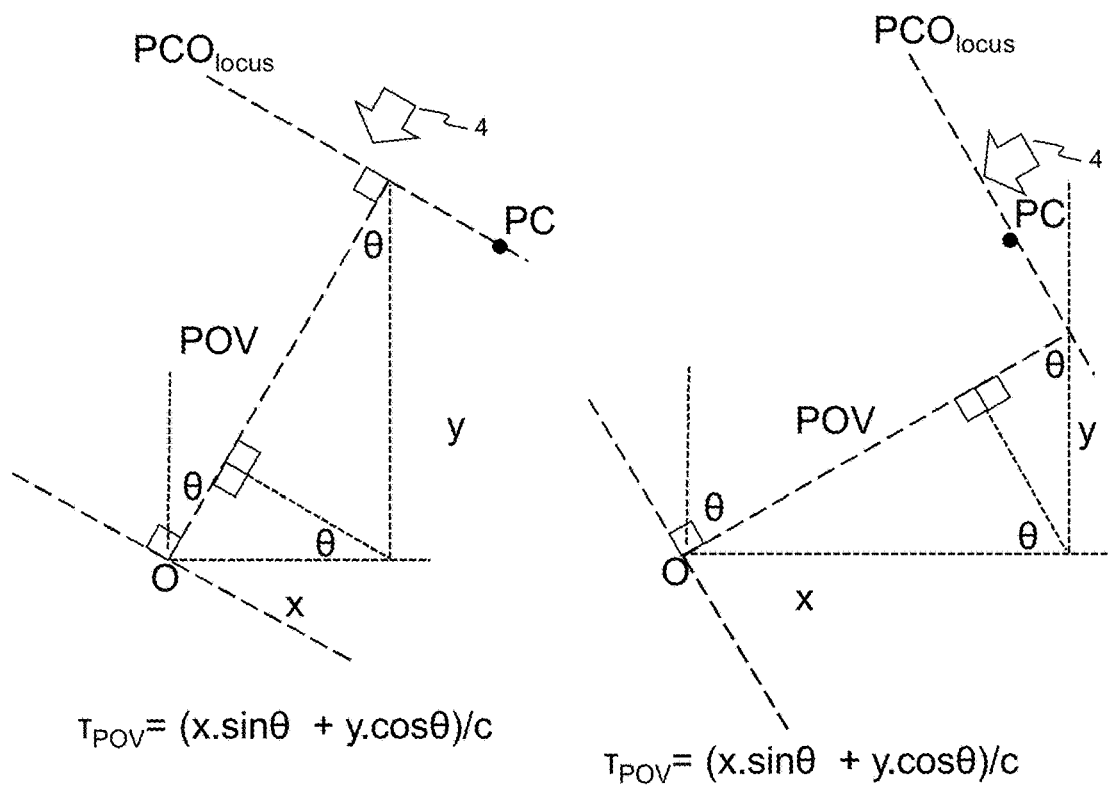
$T_{POV} = (x.\sin\theta + y.\cos\theta)/c$
FIG. 6A
$T_{POV} = (x.\sin\theta + y.\cos\theta)/c$
FIG. 6B

POSITIONING OF AN APPARATUS USING RADIO SIGNALS

CROSS-REFERENCE TO RELATED APPLICATIONS

This application claims priority to European Patent Application No. 21199607.9, filed Sep. 28, 2021, the entire contents of which are incorporated herein by reference.

TECHNOLOGICAL FIELD

Embodiments of the present disclosure relate to enabling positioning of an apparatus using radio signals communicated between reference points and the apparatus.

BACKGROUND

It is known to position an apparatus using measurement of a distance between the apparatus and each one of a plurality of located reference points. This is called trilateration, although more than three distances/reference points can be used.

Mathematically trilateration finds a position x of the apparatus that minimizes an error function. An error function can be defined, for a putative position $x_p$ of the apparatus, that depends upon the magnitude, for each reference point r, of a difference between a measured distance $d_{pr}(x_p)$ between the putative position $x_p$ and the reference point and an expected (e.g. calculated) distance $D_{pr}$ between the putative position $x_p$ and the known position of the reference point.

For example, $x = \mathrm{Argmin}_{x_p}(\Sigma_r (d_{pr}(x_p) - D_{pr})^2)$. Other optimization approaches can be used.

The distance $d_{pr}(x_p)$ can be measured using positioning radio signals transmitted between the reference points and the apparatus.

BRIEF SUMMARY

According to various, but not necessarily all, embodiments there is provided an apparatus comprising:
multiple antennas; and means for
converting measurements of time of arrival of a positioning reference signal at the multiple antennas to a compensation value and using the compensation value to produce a compensated time of arrival measurement for the positioning reference signal; and
providing compensated time of arrival measurements for a plurality of positioning reference signals from different reference points to enable positioning of the apparatus.

In some but not necessarily all examples, the compensation value compensates for a phase center offset of an antenna that receives the positioning reference signal, wherein the phase center offset varies with angle of arrival of the positioning reference signal.

In some but not necessarily all examples, the apparatus is configured to enable positioning of the apparatus using downlink time difference of arrival (DL-TDOA).

In some but not necessarily all examples, positioning reference signal has a frequency of less than 6 or 8 GHz.

In some but not necessarily all examples, the apparatus comprises means for converting measurements of time of arrival of a positioning reference signal at the multiple antennas to current phase center offset values for the multiple antennas and using the current phase center offset values for the multiple antennas to compensate a time of arrival measurement for the positioning reference signal.

In some but not necessarily all examples, the apparatus comprises: a mapping database comprising multiple entries, wherein different entries are accessed via different combinations of measurements of time of arrival of a positioning reference signal at the multiple antennas;
means for accessing an entry of the database via a combination of measurements of time of arrival of a positioning reference signal at the multiple antennas to obtain compensation values for the measurements of time of arrival of the positioning reference signal at the multiple antennas.

In some but not necessarily all examples, the entry of the database stores compensation values for the measurements of time of arrival of a positioning reference signal at the multiple antennas
or stores values for calculating compensation values for the measurements of time of arrival of a positioning reference signal at the multiple antennas.

In some but not necessarily all examples at least one entry of the database is associated with a phase center offset for each of some or all the multiple antennas, wherein the associated phase center offset determines the compensation value used for compensating time of arrival of a positioning reference signal at the respective antenna.

In some but not necessarily all examples, the apparatus is configured to use the accessed entry to obtain an estimated angle of arrival of the positioning reference signal.

In some but not necessarily all examples, the apparatus is configured, if the measurements of time of arrival of the positioning reference signal at the multiple antennas, for each of some or all of a plurality of positioning reference signals from different reference points, are insufficient to disambiguate a position of the apparatus to:
convert the measurements of time of arrival of the positioning reference signal at the multiple antennas to an angle of arrival, for each of some or all of the plurality of positioning reference signals from different reference points; and
using the angles of arrival to enable disambiguation of the position of the apparatus In some but not necessarily all examples, the apparatus is configured to use compensated time of arrival measurements to position the apparatus or
the apparatus is configured to transmit compensated time of arrival measurements for a plurality of positioning reference signals from different reference points to enable positioning of the apparatus.

In some but not necessarily all examples, each of some or all of the multiple antennas has, in-situ, a unique radiation pattern and as such the phase center offset for any given angle of arrival will be different for each of some or all of the multiple antennas, wherein the phase center offset for an antenna is an offset of a physical phase reference position from a defined origin.

In some but not necessarily all examples, the apparatus is configured as user equipment or as a component of a vehicle.

According to various, but not necessarily all, embodiments there is provided a method comprising:
obtaining a compensated time of arrival measurement for a first positioning reference signal from a first reference point comprising:
converting measurements of time of arrival of the first positioning reference signal at multiple antennas of an apparatus to a compensation value and
using the compensation value to produce a compensated time of arrival measurement for the first positioning reference signal; and obtaining a compensated time of arrival measurement for a second positioning reference signal from a second reference point comprising:

converting measurements of time of arrival of the second positioning reference signal at the multiple antennas of the apparatus to a compensation value and using the compensation value to produce a compensated time of arrival measurement for the second positioning reference signal; and providing compensated time of arrival measurements for at least the first positioning reference signal and the second positioning references signal to enable positioning of the apparatus.

According to various, but not necessarily all, embodiments there is provided a computer program comprising instructions that when run on at least one processor of an apparatus causes the apparatus to:

convert measurements of time of arrival of a positioning reference signal at multiple antennas of an apparatus to a compensation value and produce, using the compensation value, a compensated time of arrival measurement for the positioning reference signal; and obtain the compensated time of arrival measurement for a plurality of different positioning reference signal from different reference positioning points to enable positioning of the apparatus.

According to various, but not necessarily all, embodiments there is provided examples as claimed in the appended claims.

BRIEF DESCRIPTION

Some examples will now be described with reference to the accompanying drawings in which:

FIG. 5 shows another example of the subject matter described herein;

FIG. 6A & FIG. 6B show other examples of the subject matter described herein;

Figure 1:
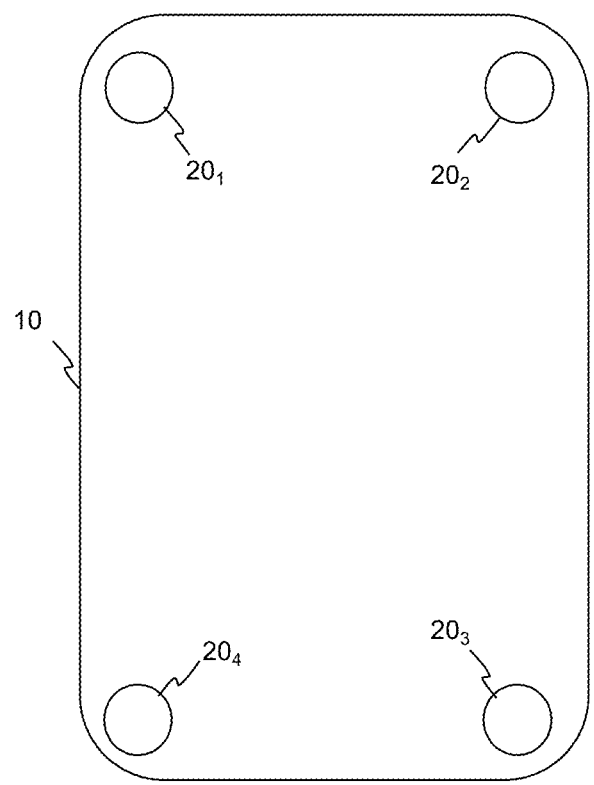
FIG. 1 shows an example of the subject matter described herein.

In the following description a class (or set) can be referenced using a reference number without a subscript index and an instance of the class (member of the set) can be referenced using a reference number with a particular subscript index.

DETAILED DESCRIPTION

The distances used for trilateration can be measured using time of arrival of positioning radio signals transmitted between the reference points and the apparatus. These radio signals when transmitted to the apparatus will be referred to as positioning reference signals.

Previously, trilateration assumes that each positioning reference signal received by the apparatus, is received at the same position on the apparatus or that any change in the reception position for different positioning reference signals does not introduce a significant error to the time of arrival.

In some apparatus, reception diversity is used. The antennas of the apparatus are at different positions, often spaced apart, to achieve a different path to each antenna for a positioning reference signal transmitted from the reference point.

The fact that the antennas have different characteristics and have different positions can be a source of error for trilateration.

In the following examples, an apparatus 10 comprises multiple antennas 20; and positioning means for enabling positioning of the apparatus 10.

The positioning means comprises:

conversion means for converting 66 measurements of time of arrival of a positioning reference signal 4 at the multiple antennas 20 to a compensation value 67;

compensation means for using 68 the compensation value 67 to produce a compensated time of arrival measurement 69 for the positioning reference signal 4; and enabling means 70 for providing compensated time of arrival measurements 69 for a plurality of positioning reference signals 4 from different reference points 2 to enable positioning of the apparatus 10.

FIG. 1 illustrates an example of an apparatus 10 comprising multiple antennas 20. The multiple antennas 20 are spatially diverse—they have different physical positions relative to each other.

Figure 2:
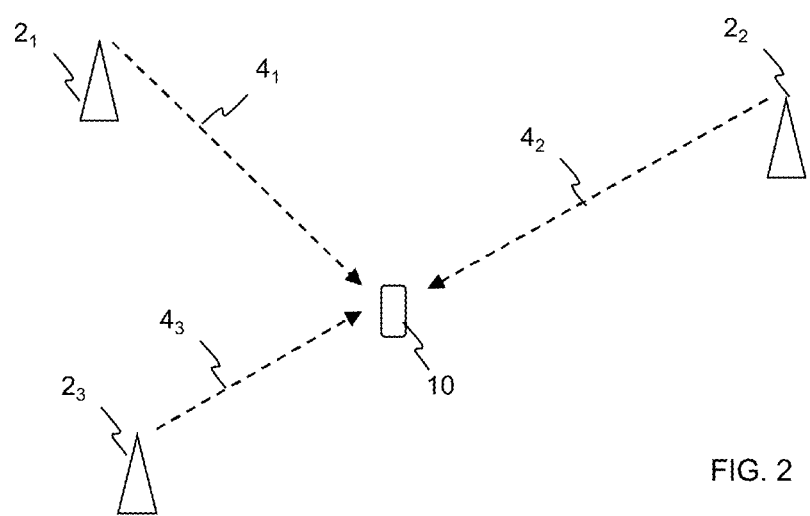
FIG. 2 shows another example of the subject matter described herein.

Each antenna 20 is configured to receive a positioning reference signal 4 illustrated in FIG. 2).

In the example illustrated, but not necessarily all examples, a first antenna $20_1$, a second antenna $20_2$, a third antenna $20_3$ and a fourth antenna $20_4$ are positioned at or towards corners or edges of the apparatus 10. In this example, the first antenna $20_1$, the second antenna $20_2$, the third antenna $20_3$ and the fourth antenna $20_4$ are spaced apart, to a significant or to a maximum or near maximum extent.

FIG. 2 illustrates a positioning system comprising multiple different reference points 2. The multiple reference points 2 are spatially diverse—they have different physical positions relative to each other.

In the example illustrated, a first reference point $2_1$ transmits a first reference signal $4_1$, a second reference point $2_2$ transmits a second reference signal $4_2$ and a third reference point $2_3$ transmits a third reference signal $4_3$. In other examples there can be more or less first reference points 2 transmitting respective reference signals 4.

Each reference point 2 is configured to transmit a positioning reference signal 4. The positioning reference signal 4 can comprise far field electromagnetic waves, and can therefore be referred to as a radio signal which includes radio frequency signals and microwave frequency signals, for example.

In some but not necessarily all examples, the positioning reference signal 4 transmitted from a reference point 2 can have different radio characteristics than the positioning reference signal 4 transmitted from a different reference point 2.

In some but not necessarily all examples, the positioning reference signal 4 transmitted from a reference point 2 can comprise data that is different to data comprised in a positioning reference signal 4 transmitted from a different reference point 2.

The apparatus 10 receives the multiple positioning reference signals 4 from the different respective reference points 2. The reception of multiple positioning reference signal 4 provides information used to estimate a distance (or a proxy parameter dependent upon the distance) that changes with the spatial separation between the apparatus 10 and the reference point 2 that has transmitted the positioning reference signal 4 received at the apparatus. The reception of multiple positioning reference signals 4 provides the estimated distances (or proxy parameters dependent upon the distances) from the apparatus 10 to the respective reference points 2 transmitting the multiple positioning reference signals 4. An estimated distance can, for example, be expressed as an absolute distance—the spatial separation between the apparatus 10 and the reference point 2 that has transmitted the positioning reference signal 4 received at the apparatus 10 or can, for example, be expressed as a relative distance—a difference between two such physical distances.

In the following examples, a time of arrival of positioning reference signal 4 is used as a proxy parameter for estimated distance and a difference between time of arrival of positioning reference signals 4 (delta time of arrival) is used as a proxy parameter for a difference between distances to the respective reference points 2.

A time of arrival of a positioning reference signal 4, relative to its time of transmission, can be used as a proxy parameter for absolute distance.

A difference between a time of arrival of a positioning reference signal 4 from one reference point 2 and a time of arrival of a positioning reference signal 4 from a different reference point 2 can be used as a proxy parameter for relative distance.

Knowledge of the estimated distances (absolute or relative) of the apparatus 10 is used with knowledge of positions of the reference points 2 that transmitted received positioning reference signals 4 to position the apparatus 10. This positioning can, for example, occur at the apparatus 10 or remote from the apparatus 10. Knowledge of the estimated distances (absolute or relative) of the apparatus 10 can be transferred from the apparatus 10 for such remote determination.

In some examples, the apparatus 10 is configured as a terminal of a radio telecommunication network. For example, the apparatus 10 can be user equipment in a third-generation partnership (3GPP) radio telecommunication network. In a radio telecommunication network, a base station is used to communicate with a terminal over a radio interface. In at least some examples, the reference points 2 are base stations of the radio telecommunication network. In at least some examples, the positioning reference signals 4 are downlink reference signals controlled by the radio telecommunication network.

In some examples, the positioning reference signal 4 has a frequency of less than 6 or 8 GHz.

Figure 3:
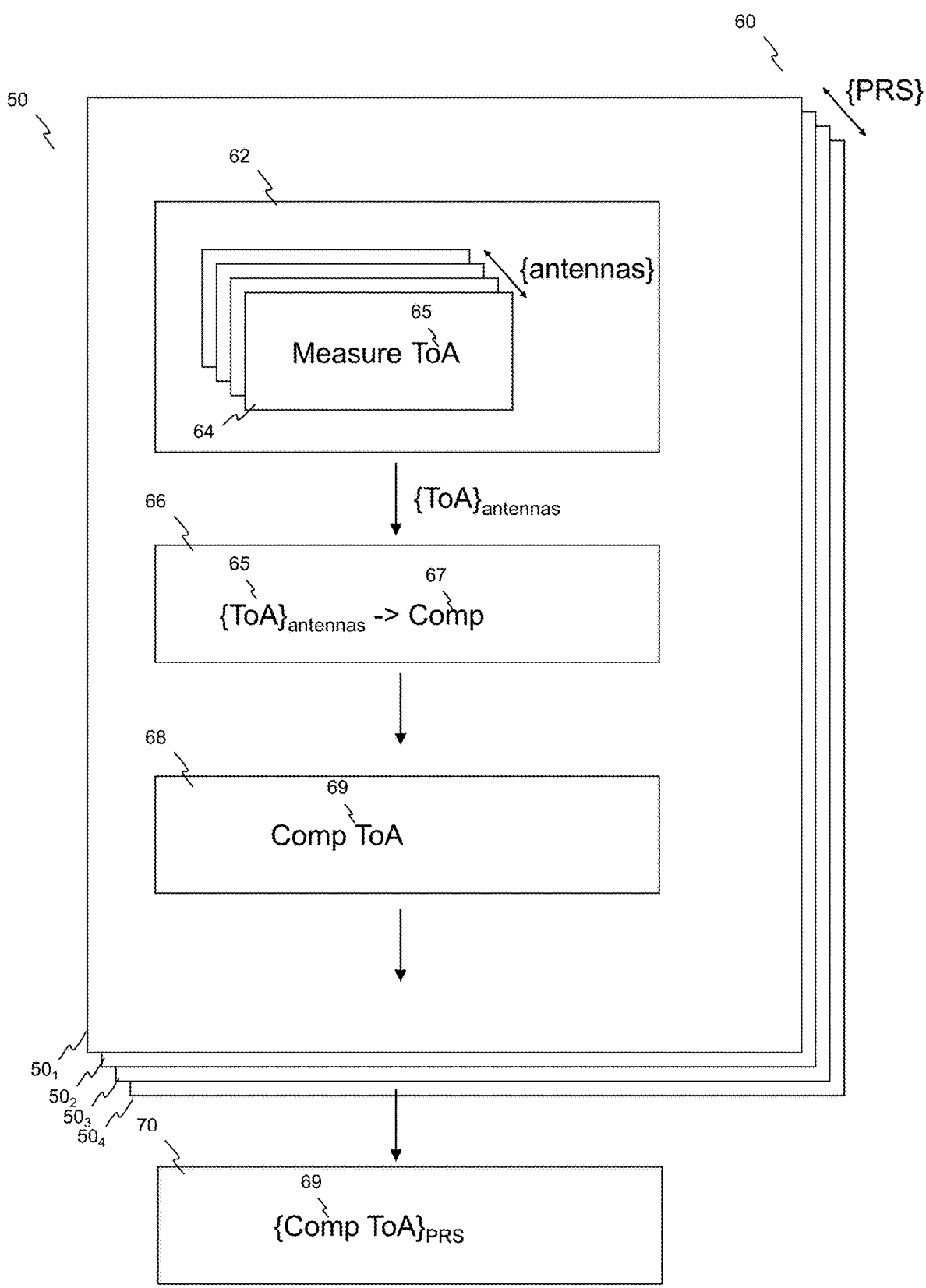
FIG. 3 shows another example of the subject matter described herein.

FIG. 3 illustrates a method 60. The method comprises a series of blocks $50_1$, $50_2$, $50_3$ . . . each associated with a respective positioning reference signal (PRS) $4_1$, $4_2$, $4_3$ . . . transmitted from respective reference points $2_1$, $2_2$, $2_3$ . . . . Each block $50_i$ compensates a distance estimate $d_i$ (by compensating the equivalent time of arrival $ToA_i$) based on reception of the respective positioning reference signal (PRS) $4_i$ at one or more of the antennas 20 of the apparatus 10.

In this example time of arrival is compensated, however, in other examples the compensation can be applied to delta time of arrival or equivalent parameters.

For a particular positioning reference signal (PRS) 4, there is a time of arrival (ToA) 65 associated with each antenna 20. There is consequently a set of time of arrivals 65 ($\{ToA\}_{antenna}$) associated with the set of multiple antennas 20 ({antennas}).

At block $50_1$, the method comprises:
obtaining a compensated time of arrival measurement 69 for a first positioning reference signal $4_1$ from a first reference point $2_1$ comprising:
    at sub-block 62, measuring 64 time of arrival 65 of the first positioning reference signal $4_1$ at multiple antennas 20 of an apparatus 10;
    at sub-block 66, converting the measurements of time of arrival 65 of the first positioning reference signal $4_1$ at multiple antennas 20 of an apparatus 10 to a compensation value 67 and
    at sub-block 68, using the compensation value 67 to produce a compensated time of arrival measurement 69 for the first positioning reference signal $4_1$.

At block $50_2$, the method comprises:
obtaining a compensated time of arrival measurement 69 for a second positioning reference signal $4_2$ from a second reference point $2_2$ comprising:
    at sub-block 62, measuring 64 time of arrival 65 of the second positioning reference signal $4_2$ at multiple antennas 20 of the apparatus 10;
    at sub-block 66, converting the measurements of time of arrival 65 of the second positioning reference signal 42 at multiple antennas 20 of the apparatus 10 to a compensation value 67 and
    at sub-block 68, using the compensation value 67 to produce a compensated time of arrival measurement 69 for the second positioning reference signal $4_2$.

In general, at block $50_i$, the method comprises:
obtaining a compensated time of arrival measurement 69 for an ith positioning reference signal $4_i$ from an ith reference point $2_i$ comprising:
    at sub-block 62, measuring 64 time of arrival 65 of the ith positioning reference signal $4_i$ at multiple antennas 20 of the apparatus 10;
    at sub-block 66, converting the measurements of time of arrival 65 of the ith positioning reference signal $4_i$ at multiple antennas 20 of the apparatus 10 to a compensation value 67 and
    at sub-block 68, using the compensation value 67 to produce a compensated time of arrival measurement 69 for the ith positioning reference signal $4_i$.

At block 70, the method comprises providing compensated time of arrival measurements 69 for the first positioning reference signal $4_1$ and the second positioning reference signal $4_2$ (and optionally other compensated time of arrival measurements 69 for other positioning reference signals) to enable positioning of the apparatus 10.

The apparatus 10 is configured to perform the method 60 and comprises means for converting measurements of time of arrival 65 of a positioning reference signal $4_i$ from reference point $4_i$ at the multiple antennas 20 to a compensation value 67 and using the compensation value 67 to produce a compensated time of arrival measurement 69 for the positioning reference signal $4_i$ and is configured to provide 70 compensated time of arrival measurements 69 for a plurality of positioning reference signals . . . $4_{i-1}$, $4_i$, $4_{i+1}$ . . . from different reference points . . . $2_{i-1}$, $2_i$, $2_{i+1}$ . . . to enable positioning of the apparatus 10.

The apparatus 10 can comprise means for measuring 64 time of arrival 65 of a positioning reference signal $4_i$ at the multiple antennas 20. The measurement can comprise measuring 64 the time of arrival 65 of that positioning reference signal 4 at each one of the multiple antennas 20 or a subset of the multiple antennas 20.

Figure 4:
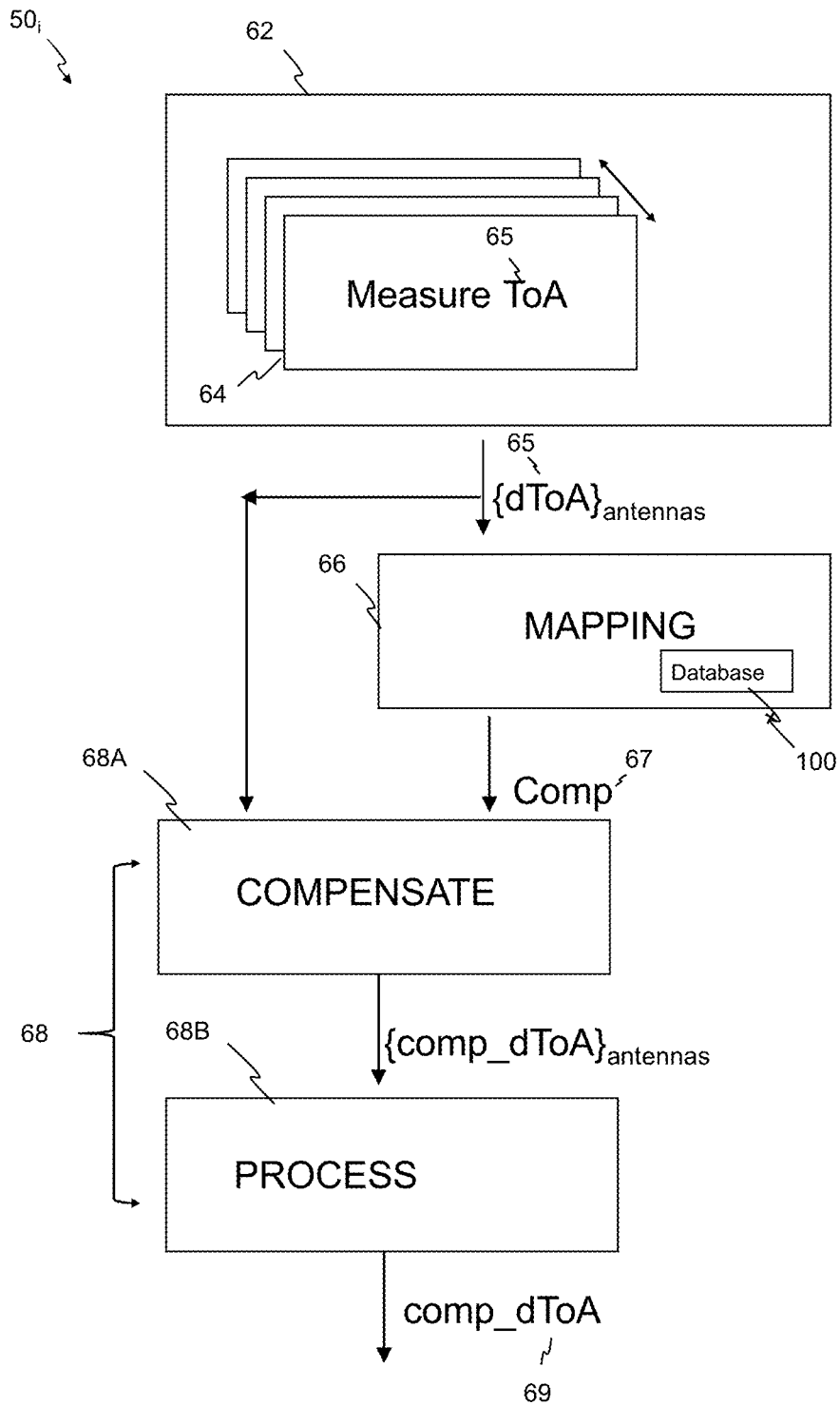
FIG. 4 shows another example of the subject matter described herein.

FIG. 4 illustrates an example of block $50_i$ as previously described that is used for obtaining a compensated time of arrival measurement 69 for a positioning reference signal $4_i$ from a reference point $2_i$. Some or all of the blocks $50_i$ in FIG. 3 can be replaced by an equivalent block $50_i$ from FIG. 4.

In this example delta time of arrival (dToA) is compensated.

For a particular positioning reference signal (PRS) 4, there is a delta time of arrival (dToA) 65 associated with each antenna 20. There is consequently a set of time of arrivals 65 ($\{dToA\}_{antennas}$) associated with the set of multiple antennas 20 ($\{antennas\}$).

In this example and in other examples, the apparatus 10 comprises a mapping database 100 that is used for converting 66 the measurements of time of arrival 65 of the positioning reference signal $4_i$ at multiple antennas 20 of the apparatus 10 to a compensation value 67.

The mapping database 100 can comprise multiple entries each entry being associated with a compensation value 67 (which can comprise a set of compensations for one or more of the respective measurements of time of arrival 65). The different entries are each accessed via different combinations of measurements of time of arrival 65 of a positioning reference signal 4 at the multiple antennas 20.

Thus, the set of measurements of time of arrival of the positioning reference signal $4_i$ at the multiple antennas 20 can be used to look-up a compensation value $67_i$.

An entry of the database 100 can store a set of compensations (as a compensation value $67_i$) for the measurements of time of arrival 65 of a positioning reference signal $4_i$ at the multiple antennas 20 or store values for calculating a set of compensations (as a compensation value $67_i$) for the measurements of time of arrival 65 of a positioning reference signal 4 at the multiple antennas 20.

The apparatus 10 comprises means for accessing an entry of the database 100 via an ordered sequence of measurements of time of arrival 65 of a positioning reference signal $4_i$ at the multiple antennas 20 to obtain a compensation value $67_i$ for the measurements of time of arrival 65 of the positioning reference signal 4 at the multiple antennas 20.

Each compensation in the set of compensations defined by the compensation value $67_i$ can be used to compensate 68A each time of arrival 65 of a positioning reference signal 4 at each of the respective antennas 20. The compensated times of arrival of the positioning reference signal 4 at the respective antennas 20 can then be processed 68B to obtain a compensated time of arrival 69 of the positioning reference signal 4 at the apparatus 10.

The compensation can be applied to the time of arrival by applying it to an absolute value (e.g. ToA FIG. 3) or a relative value (e.g. dToA FIG. 4).

As illustrated in FIG. 5, in at least some examples the radiation patterns 22 associated with the antennas 20 are not identical. An antenna $20_j$ (not illustrated) has an associated radiation pattern $22_j$ (illustrated).

The different radiation patterns 22 can, for example, arise from intentional differences in design or unintentional differences arising from manufacturing tolerances. The physical placement on the chassis can be a significant factor. The different radiation patterns 22 can, for example, be at least partially caused by different local environments of the antennas 20. For example, the presence of electrical conductors or electrical paths to ground can affect capacitance and hence the antenna radiation pattern 22 of the antenna 20.

The different radiation patterns 22 result in a center of the antenna in phase space (phase center PC) being offset by different amounts from a physical center (O) of the antenna 20. It can be difficult to compensate for the position shift arising from different antenna radiation patterns 22.

Each of the multiple antennas 20 has, in-situ, a unique radiation pattern 22 and as such the phase center offset (PCO) for any given angle of arrival (AoA) will be different for each antenna 20. The phase center offset (PCO) for an antenna 20 is an offset of a physical phase reference position (phase center) from a defined origin (e.g. physical center).

In FIGS. 6A, 6B the defined origin O is used to measure an angle of arrival (AoA) θ of a positioning reference signal 4. A radiation pattern 22 causes a particular phase center offset (PCO) for that angle of arrival (AoA). The PCO is the offset of the physical phase reference position from the origin. The displacement of the phase center offset (PCO) from the origin O can be represented as a propagation offset vector (POV). The length of the propagation offset vector (POV) represents a delay (relative to the origin) that comprises a fixed component and a variable component. The fixed component, if any, represents the spatial separation between the origin O and the phase reference position (e.g. the physical center) of the antenna. The variable component represents the difference between the phase reference position (e.g. physical center) of the antenna and the phase center of the antenna 20. The variable component is compensated for by the compensation value 67.

The compensation value 67 (compensations for each antenna 20) for different angles of arrival (AoA) θ can be measured in the laboratory to create entries for the mapping database 100 which can then be loaded onto all the apparatus 10 in a production line.

The lengths of the propagation offset vectors (POV) of the antennas 20 are independent of power variations due to fading and can be used to estimate the Angle of Arrival (AoA).

A compensation ($C_{jθ}$) compensates for a phase center offset of a particular antenna $20_j$ that receives the positioning reference signal 4 from a particular direction of arrival θ. The phase center offset can vary with the antenna $20_j$ and varies with the angle of arrival θ of the positioning reference signal 4.

A compensation value 67 for an angle of arrival θ is a set of compensations ($C_{jθ}$) for the set of antennas $20_j$, j=1, 2 . . . .

The pattern of lengths of the propagation offset vectors (POV) of the antennas 20 can be used to estimate the Angle of Arrival (AoA). Also, the pattern of differences between lengths of the propagation offset vectors (POV) in the antennas 20 can be used to estimate the Angle of Arrival (AoA). $20_j$. Thus, the pattern of time differences $\{dToA\}_{antennas}$ between time of arrival for an incoming positioning reference signal 4 can be used to estimate the Angle of Arrival (AoA) of the positioning reference signal 4.

The pattern of time differences $\{dToA\}_{antennas}$ or the associated estimated Angle of Arrival (AoA) can be used to look-up, in the mapping database 100, the compensation ($C_{jθ}$) for each antenna $20_j$ at that angle of arrival θ. The result is a set of compensations, one for each antenna 20, for a particular positioning reference signal associated with the angle of arrival θ.

As illustrated in FIG. 4, the set of compensations ($C_{j\theta}$) for all antennas at a particular angle of arrival can be accessed 66 as a database entry as the compensation value 67. The compensation value 67 (set of compensations for the antennas) is used to compensate 68A the time differences $\{dToA\}_{antennas}$ of the respective antennas to produce a set of compensated time differences $\{comp\_dTOA\}_{antennas}$ for the respective antennas.

For example, for each antenna $20_j$, and angle of arrival $\theta$, $comp\_dTOA=dTOA+C_{j\theta}$.

The set of compensated time differences $\{comp\_dTOA\}_{antennas}$ for the respective antennas 20 are processed 68B to produce a compensated time difference 69 (comp_dTOA) for the apparatus 10.

Thus, the measurements of time of arrival 65 of a particular positioning reference signal $4_i$ at multiple antennas $20_j$ of an apparatus 10 are converted to a compensation value 67 used to produce a compensated time of arrival measurement 69 for the particular positioning reference signal $4_i$. In this example, the time of arrival 65 is a time difference dToA and the compensated time of arrival measurement 69 is a compensated time difference (comp_dTOA).

The processing 68B can, for example, comprise calculating an average of the compensated time differences $\{comp\_dTOA\}_{antennas}$ in the set of compensated time differences $\{comp\_dTOA\}_{antennas}$. This can be an average across all antennas for a particular positioning reference signal (particular angle of arrival). The average is the compensated time difference 69 (comp_dTOA) for the apparatus 10.

The processing 68B can, for example, comprise selecting one of the compensated time differences comp_dTOA in the set of compensated time differences $\{comp\_dTOA\}_{antennas}$. The selected one of compensated time differences is the compensated time difference 69 (comp_dTOA) for the apparatus 10. The selection can be based on any suitable criterion. For example, the compensated time difference with smallest variance can be selected.

This process 50 can be repeated for multiple different positioning reference signals 4 with different angles of arrival, as previously described, to produce a compensated time difference 69 (comp_dTOA) for the apparatus 10 for each positioning reference signal 4.

The apparatus 10 enables positioning of the apparatus 10 using downlink time difference of arrival (DL-TDOA) based on the compensated time differences 69 (comp_dTOA) for the apparatus 10 for the multiple positioning reference signals 4.

It will be appreciated from the foregoing that the apparatus 10 can be configured to convert measurements of time of arrival of a positioning reference signal 4 at the multiple antennas 20 to current phase center offset values for the multiple antennas 20 and using the current phase center offset values for the multiple antennas 20 to compensate a time of arrival measurement for the positioning reference signal 4.

An entry of the database 100, associated with a particular angle of arrival, is associated with a phase center offset for each of the multiple antennas 20. The associated phase center offset determines the compensations $C_{j\theta}$ used for compensating time of arrival of a positioning reference signal 4 (received at angle of arrival $\theta$) at the respective antennas $20_j$.

Using simple trilateration to find a three-dimensional position, normally requires that the reference points 2 are separated over three dimensions. If the reference points 2 are separated over two-dimensions (a single plane), then simple trilateration provides ambiguous positions on either side of the plane (e.g. in some examples. the locus of intersecting spheres). The ambiguity can be resolved by not only matching the equivalent distance to the reference points on the plane (radius of the spheres) but also matching a detected angle of arrival to the expected angle of arrival for the respective reference points 2.

Figure 7:
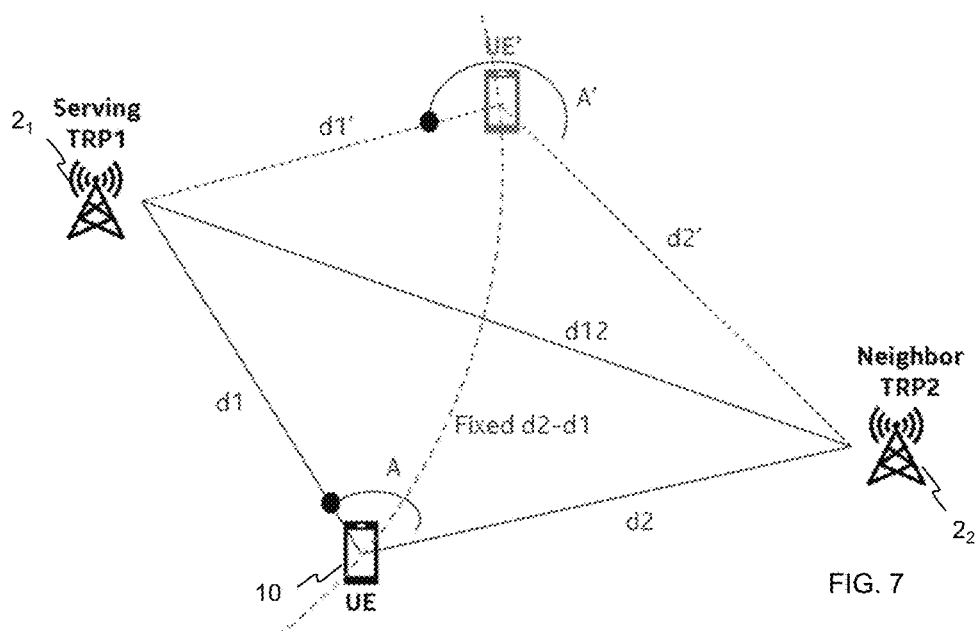
FIG. 7 shows another example of the subject matter described herein.
Figure 8:
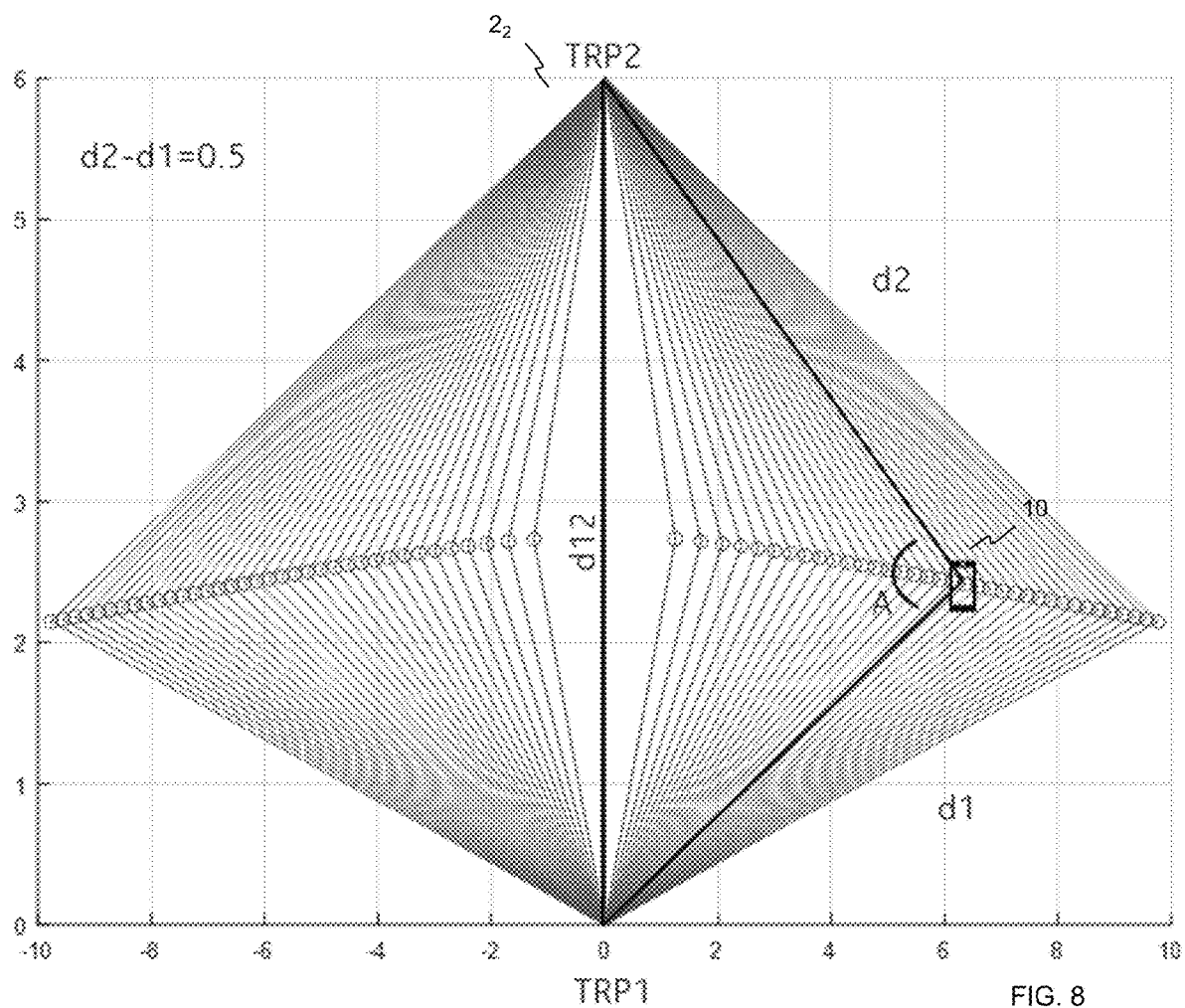
FIG. 8 shows another example of the subject matter described herein.

As illustrated in FIG. 7, using simple trilateration to find a two-dimensional position of the apparatus 10, normally requires that the reference points 2 are separated over two dimensions. If the reference points 2 are separated over a single dimension (a single line), then simple trilateration provides ambiguous positions on either side of the line (e.g. in some examples the locus of intersecting circles). The ambiguity can be resolved by not only matching the distances to the reference points 2 on the line (radius of the circles) but also matching a detected angle of arrival to the expected angle of arrival for the respective reference points 2. As illustrated in FIGS. 7 & 8, the vector difference between the detected angle of arrivals of the positioning reference signals resolves the ambiguity. If the vector difference A is less than 180° it is to one side of the line (the right-side in FIG. 8) and if the vector difference is more than 180° it is to the other side of the line.

Figure 9:
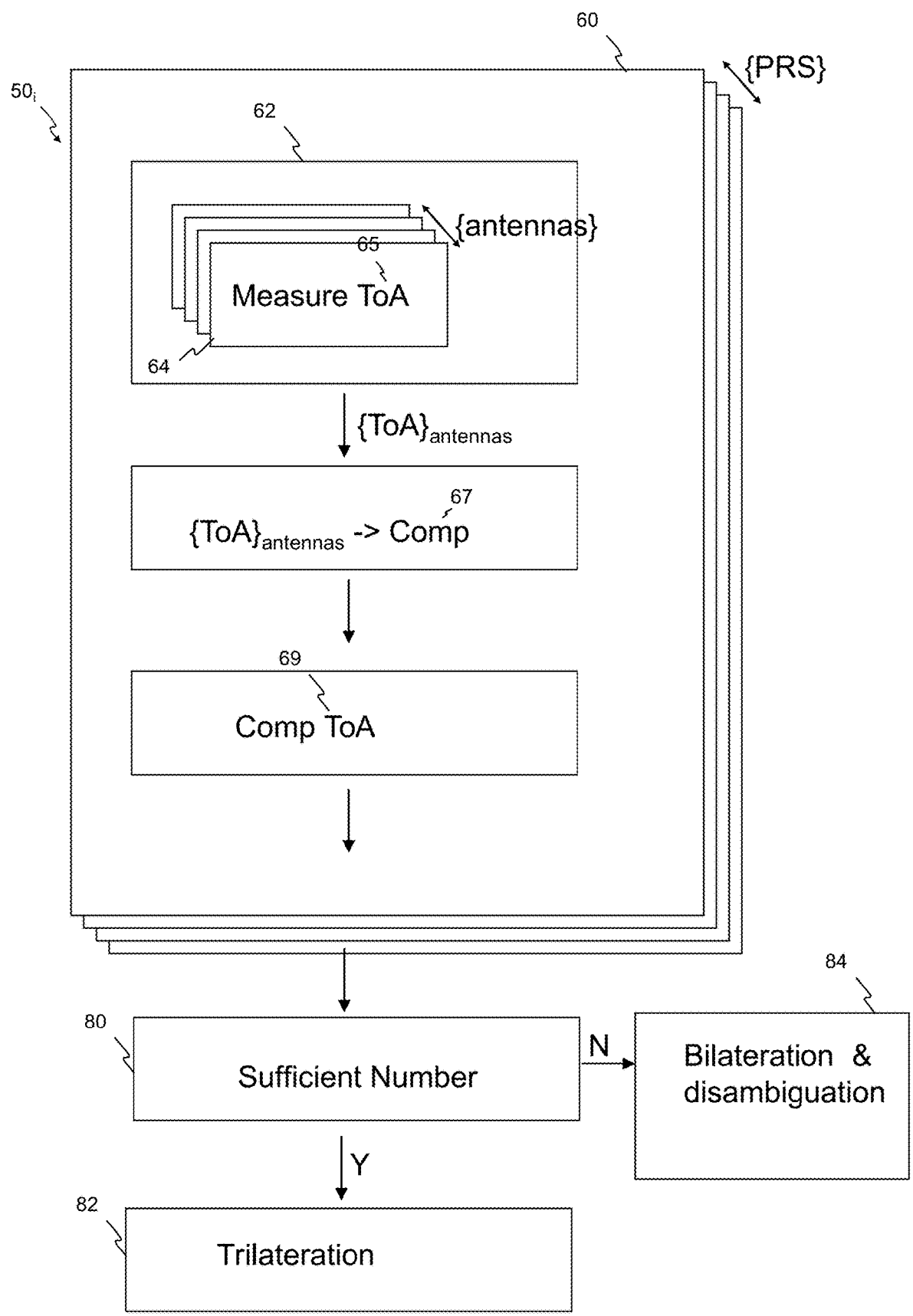
FIG. 9 shows another example of the subject matter described herein.

FIG. 9 illustrates an example, in which the example of FIG. 3 has been extended.

If there are a sufficient number of appropriately positioned reference points 2 to enable trilateration without ambiguity, then trilateration is enabled. If there are an insufficient number of appropriately positioned reference points 2 to enable trilateration without ambiguity, then trilateration is not enabled and instead disambiguation is enabled. The disambiguation uses a detected angle of arrival of the positioning reference signal 4.

Figure 10:
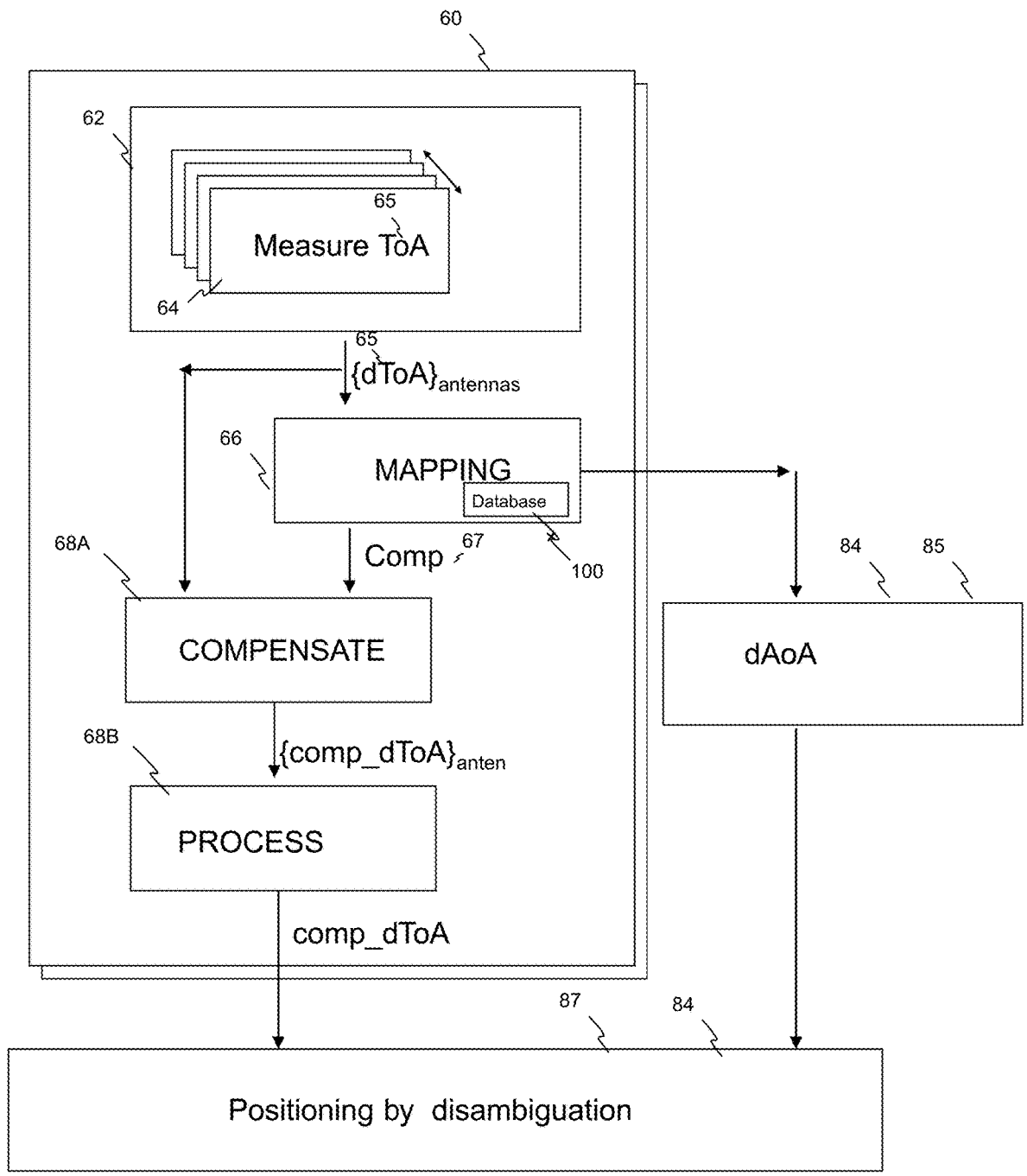
FIG. 10 shows another example of the subject matter described herein.

In case only two reference points 2 are visible then unambiguous triangulation is not possible and bi-lateration is performed as illustrated in FIG. 10. The position of the apparatus 10 is determined by disambiguating the ambiguous positions using angle of arrival information.

The pattern of time differences $\{dTOA\}_{antennas}$ between time of arrival for an incoming positioning reference signal 4 can be used to estimate the Angle of Arrival (AoA) of the reference positioning reference signal 4. The Angle of Arrival (AoA) of a first positioning reference signal $4_1$ and the Angle of Arrival (AoA) of the second positioning reference signal $4_2$ can be processed 85 to produce a parameter that is used to enable disambiguation 87 of the ambiguous positions. For example, the Angle of Arrival (AoA) of the first positioning reference signal $4_1$ can be subtracted from the Angle of Arrival (AoA) of the second positioning reference signal $4_2$ to produce a difference angle that can be used to enable disambiguation 87 of the ambiguous position.

The apparatus 10 can obtain the angle of arrival when the mapping database 100 is accessed as previously described. For example, the pattern of time differences $\{dTOA\}_{antenna}$ between time of arrival for an incoming positioning reference signal 4 at the different antennas 20 can be used to estimate the Angle of Arrival (AoA) of the positioning reference signal.

The apparatus 10 can be configured, if the measurements of time of arrival of the positioning reference signal 4 at the multiple antennas 20, for each of a plurality of positioning reference signals 4 from different reference points 2, are insufficient to disambiguate a position of the apparatus 10 to:

convert the measurements of time of arrival of the positioning reference signal 4 at the multiple antennas 20 to an angle of arrival, for each of the plurality of positioning reference signals 4 from different reference points 2; and using the angles of arrival to enable disambiguation of the position of the apparatus 10.

In all of the foregoing examples, the apparatus 10 can be configured to use the compensated time of arrival measurements to position the apparatus 10. In this example the apparatus 10, performs positioning of the apparatus 10 and the apparatus 10 receives positioning assistance data from the network. The positioning assistance data can, for example, include global position coordinates for the reference points 2.

Alternatively or additionally, the apparatus 10 can be configured to transmit the compensated time of arrival measurements for a plurality of positioning reference signals 4 from different reference points 2 to enable positioning of the apparatus 10. In this example the apparatus 10, assists positioning of the apparatus 10 by another device, and the apparatus 10 does not need to receive positioning assistance data from the network. The apparatus 10 can, for example, provide the compensated TOAs (for all positioning reference signals) or the origin-referenced dTOA between all positioning reference signals to the network which determines the position.

Figure 11:
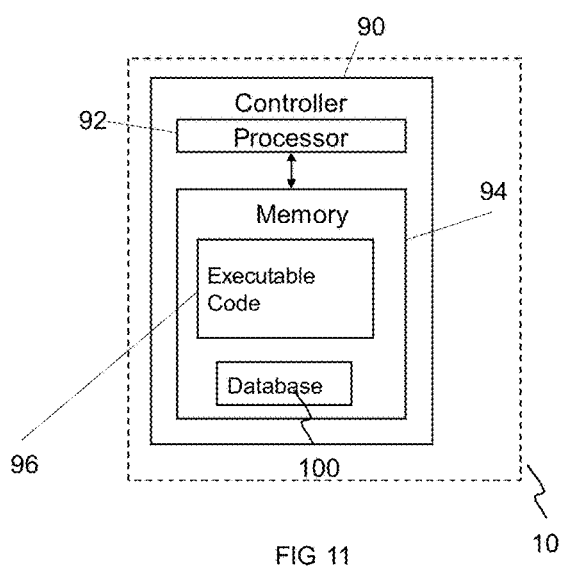
FIG. 11 shows another example of the subject matter described herein.

FIG. 11 illustrates an example of a controller 90 of the apparatus 10. The controller 90 can provide means for performing the above-described methods.

Implementation of a controller 90 may be as controller circuitry. The controller 90 may be implemented in hardware alone, have certain aspects in software including firmware alone or can be a combination of hardware and software (including firmware).

As illustrated in FIG. 11 the controller 90 may be implemented using instructions that enable hardware functionality, for example, by using executable instructions of a computer program 96 in a general-purpose or special-purpose processor 92 that may be stored on a computer readable storage medium (disk, memory etc) to be executed by such a processor 92.

The processor 92 is configured to read from and write to the memory 94. The processor 92 may also comprise an output interface via which data and/or commands are output by the processor 92 and an input interface via which data and/or commands are input to the processor 92.

The memory 94 can in some examples store, permanently or temporarily, all or part of the mapping database 100.

The memory 94 stores a computer program 96 comprising computer program instructions (computer program code) that controls the operation of the apparatus 10 10 when loaded into the processor 92. The computer program instructions, of the computer program 96, provide the logic and routines that enables the apparatus 10 to perform the methods illustrated in the Figures. The processor 92 by reading the memory 94 is able to load and execute the computer program 96.

The apparatus 10 therefore comprises:
at least one processor 92; and
at least one memory 94 including computer program code;
the at least one memory 94 and the computer program code configured to, with the at least one processor 92, cause the apparatus 10 at least to perform:
converting measurements of time of arrival of a positioning reference signal 4 at the multiple antennas 20 to a compensation value;
producing, using the compensation value, a compensated time of arrival measurement for the positioning reference signal 4; and
providing compensated time of arrival measurements for a plurality of positioning reference signals 4 from different reference points 2.

Figure 12:
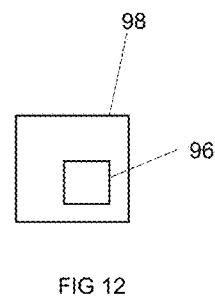
FIG. 12 shows another example of the subject matter described herein.

As illustrated in FIG. 12, the computer program 96 may arrive at the apparatus 10 via any suitable delivery mechanism 98. The delivery mechanism 98 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 96. The delivery mechanism may be a signal configured to reliably transfer the computer program 96. The apparatus 10 may propagate or transmit the computer program 96 as a computer data signal.

Computer program instructions for causing an apparatus 10 to perform at least the following or for performing at least the following:
converting measurements of time of arrival of a positioning reference signal 4 at the multiple antennas 20 to a compensation value;
producing, using the compensation value, a compensated time of arrival measurement for the positioning reference signal 4; and
providing compensated time of arrival measurements for a plurality of positioning reference signals 4 from different reference points 2.

The computer program 96 comprises instructions that when run on at least one processor 92 of an apparatus 10 causes the apparatus 10 to:
convert measurements of time of arrival of a positioning reference signal 4 at multiple antennas 20 of an apparatus 10 to a compensation value and produce, using the compensation value, a compensated time of arrival measurement for the positioning reference signal; and
obtain the compensated time of arrival measurement for a plurality of different positioning reference signal 4 from different reference positioning points to enable positioning of the apparatus 10.

The computer program instructions may be comprised in a computer program, a non-transitory computer readable medium, a computer program product, a machine readable medium. In some but not necessarily all examples, the computer program instructions may be distributed over more than one computer program.

Although the memory 94 is illustrated as a single component/circuitry it may be implemented as one or more separate components/circuitry some or all of which may be integrated/removable and/or may provide permanent/semi-permanent/dynamic/cached storage.

Although the processor 92 is illustrated as a single component/circuitry it may be implemented as one or more separate components/circuitry some or all of which may be integrated/removable. The processor 92 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus 10, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the Figures may represent steps in a method and/or sections of code in the computer program 96. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

In some examples, the apparatus 10 comprises multiple antennas 20; and positioning means 90 for enabling positioning of the apparatus 10.

The positioning means 90 comprises:
conversion means for converting 66 measurements of time of arrival of a positioning reference signal 4 at the multiple antennas 20 to a compensation value;
compensation means for using 68 the compensation value to produce a compensated time of arrival measurement for the positioning reference signal 4; and
enabling means for providing 70 compensated time of arrival measurements for a plurality of positioning reference signals 4 from different reference points 2 to enable positioning of the apparatus 10.

The above-described examples, provide for horizontal and/or vertical positioning of the apparatus 10.

The above-described examples can provide for positioning of the apparatus 10 within a sub-meter accuracy. The above-described examples can provide for positioning of the apparatus 10 within an accuracy of 20 cm or even below 10 cm.

The above-described examples can provide for positioning of the apparatus 10 with low latency, high network efficiency and/or high device efficiency.

The above-described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one.." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:
1. An apparatus comprising:
multiple antennas;
at least one processor; and
at least one memory storing instructions that, when executed by the at least one processor, cause the apparatus at least to perform:
converting measurements of time of arrival of a positioning reference signal at the multiple antennas to a compensation value;
using the compensation value to produce a compensated time of arrival measurement for the positioning reference signal; and
providing compensated time of arrival measurements for a plurality of positioning reference signals from different reference points to enable positioning of the apparatus.
2. An apparatus as claimed in claim 1, wherein the compensation value compensates for a phase center offset of an antenna that receives the positioning reference signal,
wherein the phase center offset varies with angle of arrival of the positioning reference signal.
3. An apparatus as claimed in claim 1 configured to enable positioning of the apparatus using downlink time difference of arrival (DL-TDOA).
4. An apparatus as claimed in claim 1 wherein the positioning reference signal has a frequency of less than 6 or 8 GHz.
5. An apparatus as claimed in claim 1 wherein the instructions, when executed by the at least one processor, further cause the apparatus to convert measurements of time of arrival of a positioning reference signal at the multiple antennas to current phase center offset values for the multiple antennas and to use the current phase center offset values for the multiple antennas to compensate a time of arrival measurement for the positioning reference signal.
6. An apparatus as claimed in claim 1 further comprising:
a mapping database comprising multiple entries, wherein different entries are accessed via different combinations of measurements of time of arrival of a positioning reference signal at the multiple antennas, and
wherein the instructions, when executed by the at least one processor, further cause the apparatus to access an entry of the mapping database via a combination of measurements of time of arrival of a positioning reference signal at the multiple antennas to obtain compensation values for the measurements of time of arrival of the positioning reference signal at the multiple antennas.
7. An apparatus as claimed in claim 6 wherein the entry of the database stores compensation values for the measurements of time of arrival of a positioning reference signal at the multiple antennas
or stores values for calculating compensation values for the measurements of time of arrival of a positioning reference signal at the multiple antennas.
8. An apparatus as claimed in claim 7, wherein at least one entry of the database is associated with a phase center offset for each of some or all the multiple antennas,
wherein the associated phase center off set determines the compensation value used for compensating time of arrival of a positioning reference signal at the respective antenna.
9. An apparatus as claimed in claim 6 configured to use the accessed entry to obtain an estimated angle of arrival of the positioning reference signal.
10. An apparatus as claimed in claim 1 wherein the instructions, when executed by the at least one processor, further cause the apparatus,
if the measurements of time of arrival of the positioning reference signal at the multiple antennas, for each of some or all of a plurality of positioning reference signals from different reference points, are insufficient to disambiguate a position of the apparatus to:
convert the measurements of time of arrival of the positioning reference signal at the multiple antennas to an angle of arrival, for each of some or all of the plurality of positioning reference signals from different reference points; and
use the angles of arrival to enable disambiguation of the position of the apparatus.
11. An apparatus as claimed in claim 1 wherein the instructions, when executed by the at least one processor, further cause the apparatus to use compensated time of arrival measurements to position the apparatus
or
to transmit compensated time of arrival measurements for a plurality of positioning reference signals from different reference points to enable positioning of the apparatus.
12. An apparatus as claimed in claim 1, wherein each of some or all of the multiple antennas has, in-situ, a unique radiation pattern and as such the phase center offset for any given angle of arrival will be different for each of some or all of the multiple antennas, wherein the phase center offset for an antenna is an offset of a physical phase reference position from a defined origin.
13. An apparatus as claimed in claim 1, configured as user equipment or as a component of a vehicle.
14. A method comprising:
obtaining a compensated time of arrival measurement for a first positioning reference signal from a first reference point comprising:
converting measurements of time of arrival of the first positioning reference signal at multiple antennas of an apparatus to a compensation value and
using the compensation value to produce the compensated time of arrival measurement for the first positioning reference signal; and
obtaining a compensated time of arrival measurement for a second positioning reference signal from a second reference point comprising:

converting measurements of time of arrival of the second positioning reference signal at the multiple antennas of the apparatus to a compensation value and using the compensation value to produce the compensated time of arrival measurement for the second positioning reference signal; and providing compensated time of arrival measurements for at least the first positioning reference signal and the second positioning reference signal to enable positioning of the apparatus.

15. A method as claimed in claim 14, wherein the compensation value compensates for a phase center offset of an antenna that receives a positioning reference signal, wherein the phase center offset varies with angle of arrival of the positioning reference signal.

16. A method as claimed in claim 14 further comprising converting measurements of time of arrival of a positioning reference signal at the multiple antennas to current phase center offset values for the multiple antennas and using the current phase center offset values for the multiple antennas to compensate a time of arrival measurement for the positioning reference signal.

17. A method as claimed in claim 14 further comprising:
accessing an entry of a mapping database via a combination of measurements of time of arrival of a positioning reference signal at the multiple antennas to obtain compensation values for the measurements of time of arrival of the positioning reference signal at the multiple antennas, wherein the mapping database comprises multiple entries, wherein different entries are accessed via different combinations of measurements of time of arrival of a positioning reference signal at the multiple antennas.

18. A method as claimed in claim 17 wherein the entry of the database stores compensation values for the measurements of time of arrival of a positioning reference signal at the multiple antennas or stores values for calculating compensation values for the measurements of time of arrival of a positioning reference signal at the multiple antennas.

19. A method as claimed in claim 14 further comprising:
if the measurements of time of arrival of a positioning reference signal at the multiple antennas, for each of some or all of a plurality of positioning reference signals from different reference points, are insufficient to disambiguate a position of the apparatus:

converting the measurements of time of arrival of the positioning reference signal at the multiple antennas to an angle of arrival, for each of some or all of the plurality of positioning reference signals from different reference points; and using the angles of arrival to enable disambiguation of the position of the apparatus.

20. A non-transitory computer readable medium storing a computer program comprising instructions that when run on at least one processor of an apparatus cause the apparatus to:
convert measurements of time of arrival of a positioning reference signal at multiple antennas of apparatus to a compensation value;

produce, using the compensation value, a compensated time of arrival measurement for the positioning reference signal; and obtain the compensated time of arrival measurement for a plurality of different positioning reference signals from different reference positioning points to enable positioning of the apparatus.

* * * * *